US008587800B2

(12) United States Patent
Chae

(10) Patent No.: US 8,587,800 B2
(45) Date of Patent: Nov. 19, 2013

(54) METHOD AND APPARATUS TO GENERATE XHTML-PRINT CONTENTS

(75) Inventor: Sung-won Chae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1307 days.

(21) Appl. No.: 11/715,841

(22) Filed: Mar. 9, 2007

(65) Prior Publication Data

US 2007/0242310 A1   Oct. 18, 2007

Related U.S. Application Data

(60) Provisional application No. 60/791,412, filed on Apr. 13, 2006.

(30) Foreign Application Priority Data

May 12, 2006  (KR) .................. 10-2006-0043135

(51) Int. Cl.
    *G06K 15/02*  (2006.01)
(52) U.S. Cl.
    USPC .................. 358/1.15; 358/1.13; 358/2.1
(58) Field of Classification Search
    USPC .................. 358/1.15, 1.13, 1.18, 1.9, 2.1
    See application file for complete search history.

(56) References Cited

U.S. PATENT DOCUMENTS

| 8,086,253 B1 * | 12/2011 | Kalamkar et al. ............. 455/466 |
| 8,161,117 B2 * | 4/2012 | Ye et al. ..................... 709/206 |
| 8,223,355 B2 * | 7/2012 | McCoog et al. ............. 358/1.15 |
| 2002/0156796 A1 | 10/2002 | Hisamatsu et al. |
| 2004/0009022 A1 * | 1/2004 | Matsunaga et al. ............. 400/61 |
| 2004/0021902 A1 | 2/2004 | Ogiwara et al. |
| 2004/0167877 A1 * | 8/2004 | Thompson, III .................. 707/3 |
| 2004/0190055 A1 * | 9/2004 | Takamatsu et al. .......... 358/1.15 |
| 2004/0252332 A1 | 12/2004 | McCoog et al. |
| 2005/0015726 A1 * | 1/2005 | Tuominen ..................... 715/733 |
| 2006/0087669 A1 * | 4/2006 | Yamaguchi et al. ......... 358/1.13 |

FOREIGN PATENT DOCUMENTS

| EP | 1 489 813 A1 | 12/2004 |
| JP | 2001-063157 | 3/2001 |
| JP | 2001-285618 | 10/2001 |
| JP | 2002-171400 | 6/2002 |
| JP | 2005-012795 | 1/2005 |
| JP | 2005-018639 | 1/2005 |
| JP | 2005-50300 | 2/2005 |
| JP | 2005-51737 | 2/2005 |
| JP | 2005-102122 | 4/2005 |

(Continued)

OTHER PUBLICATIONS

Search Report issued in International Application No. PCT/KR2007/001346 on May 30, 2007.

(Continued)

*Primary Examiner* — Allen H Nguyen
(74) *Attorney, Agent, or Firm* — Staas & Halsey LLP

(57) ABSTRACT

A method and apparatus to generate XHTML data in a terminal, the method and apparatus including setting printing-related parameters to determine contents to be printed from among the contents of one or more standard data items desired to be printed, generating XHTML extension data that can be inserted into XHTML basic data prepared in advance, corresponding to the set contents, and generating the XHTML data by inserting the generated XHTML extension data into the XHTML basic data.

33 Claims, 13 Drawing Sheets

(56) References Cited

FOREIGN PATENT DOCUMENTS

| | | |
|---|---|---|
| WO | WO 2004/050374 A1 | 6/2004 |
| WO | WO 2005/109173 A1 | 11/2005 |
| WO | WO 2005/125173 A1 | 12/2005 |

OTHER PUBLICATIONS

Written Opinion issued in International Application No. PCT/KR2007/001346 on May 30, 2007.

Chinese Office Action for corresponding Chinese Patent Application No. 200780010584.9 dated Jun. 30, 2011.

Japanese Office Action for corresponding Japanese Patent Application No. 2009-505278 dated Nov. 1, 2011.

Chinese Office Action issued Mar. 1, 2012 in corresponding Chinese Patent Application 200780010584.9.

Japanese Office Action issued Jul. 24, 2012 in corresponding Japanese Patent Application 2009-505278.

Notice of Allowance issued Feb. 26, 2013 in corresponding Japanese Application No. 2009-505278, 5 pages.

\* cited by examiner

FIG. 2A

| Page Size |
|---|
| 1. 4*6 inch (Portrait) |
| 2. 6*4 inch (Landscape) |
| 3. A4 Portrait |
| 4. A4 Landscape |
| 5. Letter Portrait |
| 6. Letter Landscape |

FIG. 2B

| | | SMS Select |
|---|---|---|
| 1 | V | Jim: My daughter pictu.. |
| 2 | | Mary: Hello |
| 3 | V | Tom: Hi |
| 4 | | Cathy: Have a nice day.. |
| 5 | | Julla: How do you do |
| 6 | | John: Hello |

FIG. 2C

| Element Select ||
|---|---|
| 1. Jim: My daughter pictu.. ||
| | From |
| | To |
| | Message |
| | Time |
| | Priority lavel |
| | Privacy lavel |
| ■ | Number for reply |

| Element Select ||
|---|---|
| 3. Tom: Hi ||
| | From |
| | To |
| | Message |
| | Time |
| ■ | Number for reply |

FIG. 2D

| Element Select ||
|---|---|
| 1. Jim: My daughter pictu.. ||
| v | From |
| v | To |
| v | Message |
| v | Time |
| | Priority lavel |
| | Privacy lavel |
| ■ | Number for reply |

| Element Select ||
|---|---|
| 3. Tom: Hi ||
| v | From |
| v | To |
| v | Message |
| v | Time |
| ■ | Number for reply |

FIG. 2E

```
<?xml version="1.0" encoding="utf-8"?>
<!DOCTYPE html PUBLIC "-//W3C//DTD XHTML_Print 1.0//en"
 "htt://www.w3.org/MarkUp/DTD/xhtml-print10.dtd">
<html xmlns="http://www.w3.org/1999/xhtml">
<head>
    <title>UC3-T2 : SMS Printing</title>
    <style type="text/css">
        .Box1   {position: relative; width:100%;height:100%;}
        .HeaderBox{position: relative;width:100% ;border: 1px solid; padding: 0.1in;
                background-color:f2f8ba; overflow:hidden;}
        .BodyBox {position: relative; width:100%; border: 1px solid; padding: 0.1in;
                overflow:hidden;}

.td1 {width:20%: font-weight:bold;}
        .td2 {width:2%}

</style>
</head>
<body>
    <div class="Box1">
        <div class="HeaderBox">
            <table>
            </table>
        </div>
        <div class="BodyBox">>
        </div>

</body>
</html>
```

FIG. 2F

```
<?xml version="1.0" encoding="utf-8"?>
<!DOCTYPE html PUBLIC "-//W3C//DTD XHTML-Print 1.0//EN"
    "http://www.w3.org/MarkUp/DTD/xhtml-print10.dtd">
<html xmlns="http://www.w3.org/1999/xhtml">
<head>
        <title>UC3-T2 : SMS Printing (Receiver / Title / Message / Sender) ? relative position and size</title>
        <style type="text/css">
   [1]  @page { size: 4in 6in; margin: 0.1in;}
        .Box1   { position: relative; width:100%; height:100%;}
        .HeaderBox{ position: relative; width:100%; border: 1px solid; padding: 0.1in;
            background-color:f2f8ba; overflow:hidden;}
        .BodyBox { position: relative; width:100%; border: 1px solid; padding: 0.1in;
            overflow:hidden;}

.td1 {width:20%; font-weight:bold;}
        .td2 {width:2%}
        </style>
</head>
<body>
        <div class="Box1">
            <div class="HeaderBox">
                <table>
                    <tr>
                        <td class="td1">
                          [3] From
                        </td>
                        <td class="td2">
                          :
                        </td>
                        <td>
                          [4] Jim (010-4321-1234)
                        </td>
                    </tr>
             [2]    <tr>
                        <td class="td1">
                          [3] To
                        </td>
                        <td class="td2">
                          :
                        </td>
                        <td>
                          [4] Mark
                        </td>
                    </tr>
                    <tr>
                        <td class="td1">
                          [3] Time
                        </td>
                        <td class="td2">
                          :
                        </td>
                        <td>
                          [4] June 24, 2006 07:54 am
                        </td>
                    </tr>
                </table>
            </div>
            <div class="BodyBox">
              [5] Dear, Mark<br/>
                  Good Morning!<br/>
                  Thanks for providing additional information<br/>
                  Please send us the schedule<br/>
                  Thanks and Regards.<br/>
            </div>
        </div>
</body>
</html>
```

FIG. 2G

| From | :Jim (010-4321-1234) |
| To | :Mark |
| Time | :June 24, 2006 07:54 am |

Dear, Mark
Good Morning!
Thanks for providing additional information
Please send us the schedule
Thanks and Regards.

FIG. 2H

| From | : Jim (010-4321-1234) |
|---|---|
| To | : Mark |
| Date | : June 24, 2006 02:54 pm |

Dear, Mark
Good Morning!
Thanks for providing additional information.
Please send us the schedule
Thanks and Regards.

FIG. 2I

```xml
<?xml version="1.0" encoding="utf-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
        <title>UC3-T1 : SMS Printing (Receiver / Title / Message / Sender) ? absolute position and size</title>
        <style type="text/css">
                @page { size: 4in 6in; margin: 0.1in;}
                .Box1    { position: absolute; left: 0in; top:0.0in; width:3.8in; height:5.8in;}
                .HeaderBox { position: absolute; left:  0in; top:0.0in; width:3.8in; height:1.1in;
        border: 1px solid; padding: 0.1in; background-color:f2f8ba; overflow:hidden;}
                .BodyBox  { position: absolute; left: 0in; top:1.1in; width:3.8in; height:4.7in;
        border: 1px solid; padding: 0.1in; overflow:hidden;}

.td1 {width:0.8in; font-weight:bold;}
                .td2 {width:0.1in}

</style>
</head>
<body>
        <div class="Box1">
                <div class="HeaderBox">
                        <table>
                                <tr>
                                        <td class="td1">
                                                From
                                        </td>
                                        <td class="td2">
                                                :
                                        </td>
                                        <td>
                                        Jim (010-4321-1234)
                                        </td>
                                </tr>
                                <tr>
                                        <td class="td1">
                                                To
                                        </td>
                                        <td class="td2">
                                                :
                                        </td>
                                        <td>
                                        Mark
                                        </td>
                                </tr>
                                <tr>
                                        <td class="td1">
                                                Date
                                        </td>
                                        <td class="td2">
                                                :
                                        </td>
                                        <td>
                                        June 24, 2006 02:54 pm
                                        </td>
                                </tr>
                        </table>
                </div>
                <div class="BodyBox">
                        Dear, Mark<br/>
                        Good Morning!<br/>
                        Thanks for providing additional information.<br/>
                        Please send us the schedule<br/>
                        Thanks and Regards.<br/>
                </div>
        </div>
</body>
</html>
```

From : Jim (010-4321-1234)
To : Mark
Title : My daughter picture
Date : June 24, 2006 02:54 pm Dear, Mark
Good Morning!.
Here's shot of my daughter.

Thanks and Regards.
Jim

FIG. 3B

```
<?xml version="1.0" encoding="utf-8"?>
<!DOCTYPE html PUBLIC "-//W3C//DTD XHTML-Print 1.0//EN"
     "http://www.w3.org/MarkUp/DTD/xhtml-print10.dtd">
<html xmlns="http://www.w3.org/1999/xhtml">
<head>
    <title>UC3-T3 : MMS Printing (Receiver / Title / Message / Multimedia / Sender) ? absolute position and size</title>
    <style type="text/css">
        @page { size: 4in 6in; margin: 0.1in;}
        .Box1    { position: absolute; left: 0in; top:0.0in; width:3.8in; height:5.8in;}
        .HeaderBox { position: absolute; left: 0in; top:0.0in; width:3.8in; height:1.1in;
            border: 1px solid; padding: 0.1in; background-color:f2f8ba; overflow:hidden;}
        .BodyBox  { position: absolute; left: 0in; top:1.1in; width:3.8in; height:4.7in;
            border: 1px solid; padding: 0.1in; overflow:hidden;}

.td1 {width:0.8in; font-weight:bold;}
        .td2 {width:0.1in;}

.img1 {width:3in; height:2in;}
    </style>
</head>
<body>
    <div class="Box1">
        <div class="HeaderBox">
            <table>
                <tr>
                    <td class="td1">
                        From
                    </td>
                    <td class="td2">
                        :
                    </td>
                    <td>
                        Jim (010-4321-1234)
                    </td>
                </tr>
                <tr>
                    <td class="td1">
                        To
                    </td>
                    <td class="td2">
                        :
                    </td>
                    <td>
                        Mark
                    </td>
                </tr>
                <tr>
                    <td class="td1">
                        Title
                    </td>
                    <td class="td2">
                        :
                    </td>
                    <td>
                        My daughter picture
                    </td>
                </tr>
                <tr>
                    <td class="td1">
                        Date
                    </td>
                    <td class="td2">
                        :
                    </td>
                    <td>
                        June 24, 2006 02:54 pm
                    </td>
                </tr>
            </table>
        </div>
        <div class="BodyBox">
            Dear, Mark<br/>
            Good Morning!.<br/>
            Here's shot of my daughter.<br/>
            <img src="daughter1.jpg" class="img1" /> <br/>
            Thanks and Regards,<br/>
            Jim<br/>
        </div>
    </div>
</body>
</html>
```

```
From   : Jim (010-4321-1234)
To     : Mark
Title  : My daughter picture
Date   : June 24, 2006 02:54 pm
```

Dear, Mark
Good Morning!.
Here's shot of my daughter.

Thanks and Regards,
Jim

FIG. 3D

```
<?xml version="1.0" encoding="utf-8"?>
<!DOCTYPE html PUBLIC "-//W3C//DTD XHTML-Print 1.0//EN"
    "http://www.w3.org/MarkUp/DTD/xhtml-print10.dtd">
<html xmlns="http://www.w3.org/1999/xhtml">
<head>
    <title>UC3-T4 : MMS Printing (Receiver/ Title/ Message/ Multimedia/ Sender) ? relative position and size</title>
    <style type="text/css">
        @page { size: 4in 6in; margin: 0.1in;}
        .Box1   { position: relative; width:100%; }
        .HeaderBox{ position: relative; width:100%; border: 1px solid; padding: 0.1in;
              background-color:f2f8ba; overflow:hidden;}
        .BodyBox  { position: relative; width:100%; border: 1px solid; padding: 0.1in;
            overflow:hidden;}

.td1 {width:20%; font-weight:bold;}
        .td2 {width: 2%;}

.img1 {width:3in; height:2in;}
    </style>
</head>
<body>
    <div class="Box1">
        <div class="HeaderBox">
            <table>
                <tr>
                    <td class="td1">
                        From
                    </td>
                    <td class="td2">
                        :
                    </td>
                    <td>
                    Jim (010-4321-1234)
                    </td>
                </tr>
                <tr>
                    <td class="td1">
                        To
                    </td>
                    <td class="td2">
                        :
                    </td>
                    <td>
                    Mark
                    </td>
                </tr>
                <tr>
                    <td class="td1">
                        Title
                    </td>
                    <td class="td2">
                        :
                    </td>
                    <td>
                    My daughter picture
                    </td>
                </tr>
                <tr>
                    <td class="td1">
                        Date
                    </td>
                    <td class="td2">
                        :
                    </td>
                    <td>
                    June 24, 2008 02:54 pm
                    </td>
                </tr>
            </table>
        </div>
        <div class="BodyBox">
            Dear, Mark<br/>
            Good Morning!.<br/>
            Here's shot of my daughter.<br/>
            <img src="daughter1.jpg" class="img1" /> <br/>
            Thanks and Regards,<br/>
            Jim<br/>
        </div>
    </div>
</body>
</html>
```

METHOD AND APPARATUS TO GENERATE XHTML-PRINT CONTENTS

CROSS-REFERENCE TO RELATED APPLICATION

This application claims the benefit of Korean Patent Application No. 2006-43135, filed on May 12, 2006, in the Korean Intellectual Property Office and U.S. Provisional Application No. 60/791,412, filed on Apr. 13, 2006, in the United States Patent and Trademark Office, the disclosures of which are incorporated herein by reference.

BACKGROUND OF THE INVENTION

1. Field of the Invention

Aspects of the present invention relate to extensible hypertext markup language (XHTML)-Print printing data that is printing data in the XHTML-Print language, and more particularly, to a method and apparatus to generate XHTML-Print printing data in which XHTML-Print extension data is generated corresponding to contents set by a user by inserting the generated XHTML-Printing extension data into XHTML-Print basic data prepared in advance, thus generating the XHTML-Print printing data adaptively according to an intention of the user.

2. Description of the Related Art

There exists a need for a method of generating XHTML-Print printing data to print a variety of standardized data items stored in a terminal.

SUMMARY OF THE INVENTION

Aspects of the present invention provide a method of generating XHTML-Print printing data, by which XHTML-Print extension data is generated corresponding to contents of standard data desired to be printed, and by inserting the generated XHTML-Printing extension data into XHTML-Print basic data prepared in advance.

Aspects of the present invention also provide an apparatus to generate XHTML-Print printing data, which performs the method of generating XHTML-Print printing data.

Aspects of the present invention also provide a computer-readable recording medium having embodied thereon a computer program to execute the method of generating XHTML-Print printing data.

According to an aspect of the present invention, there is provided a method of generating extensible hypertext markup language (XHTML) data comprising: setting printing-related options to determine contents to be printed from among predetermined contents of one or more standard data items desired to be printed; generating XHTML extension data that can be inserted into XHTML basic data prepared in advance, corresponding to the set contents; and generating the XHTML data by inserting the generated XHTML extension data into XHTML basic data.

According to another aspect of the present invention, there is provided an apparatus to generate extensible hypertext markup language (XHTML) data comprising: an XHTML data setting unit to set printing-related options to determine contents to be printed from among predetermined contents of one or more standard data items desired to be printed; an XHTML basic data storage unit to store XHTML basic data included in XHTML printing data; an XHTML extension data generation unit to generate XHTML extension data that can be inserted into the XHTML basic data according to the set printing-related options; and an XHTML data generation unit to read the stored XHTML basic data, and to generate the XHTML printing data by inserting the generated XHTML extension data into the read XHTML basic data.

According to another aspect of the present invention, there is provided a computer-readable recording medium having embodied thereon a computer program to execute a method of generating XHTML data, wherein the method comprises: setting printing-related options to determine contents to be printed from among predetermined contents of one or more standard data items desired to be printed; generating XHTML extension data that can be inserted into XHTML basic data prepared in advance, corresponding to the set contents; and generating the XHTML data by inserting the generated XHTML extension data into the XHTML basic data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A through 2I are reference diagrams explaining a principle of generating XHTML-Print printing data when standard data is short message service (SMS) data, according to an embodiment of the present invention;

FIGS. 3A through 3D are reference diagrams explaining a principle of generating XHTML-Print printing data when standard data is multimedia messaging service (MMS) data, according to an embodiment of the present invention;

DETAILED DESCRIPTION OF THE EMBODIMENTS

Figure 1:
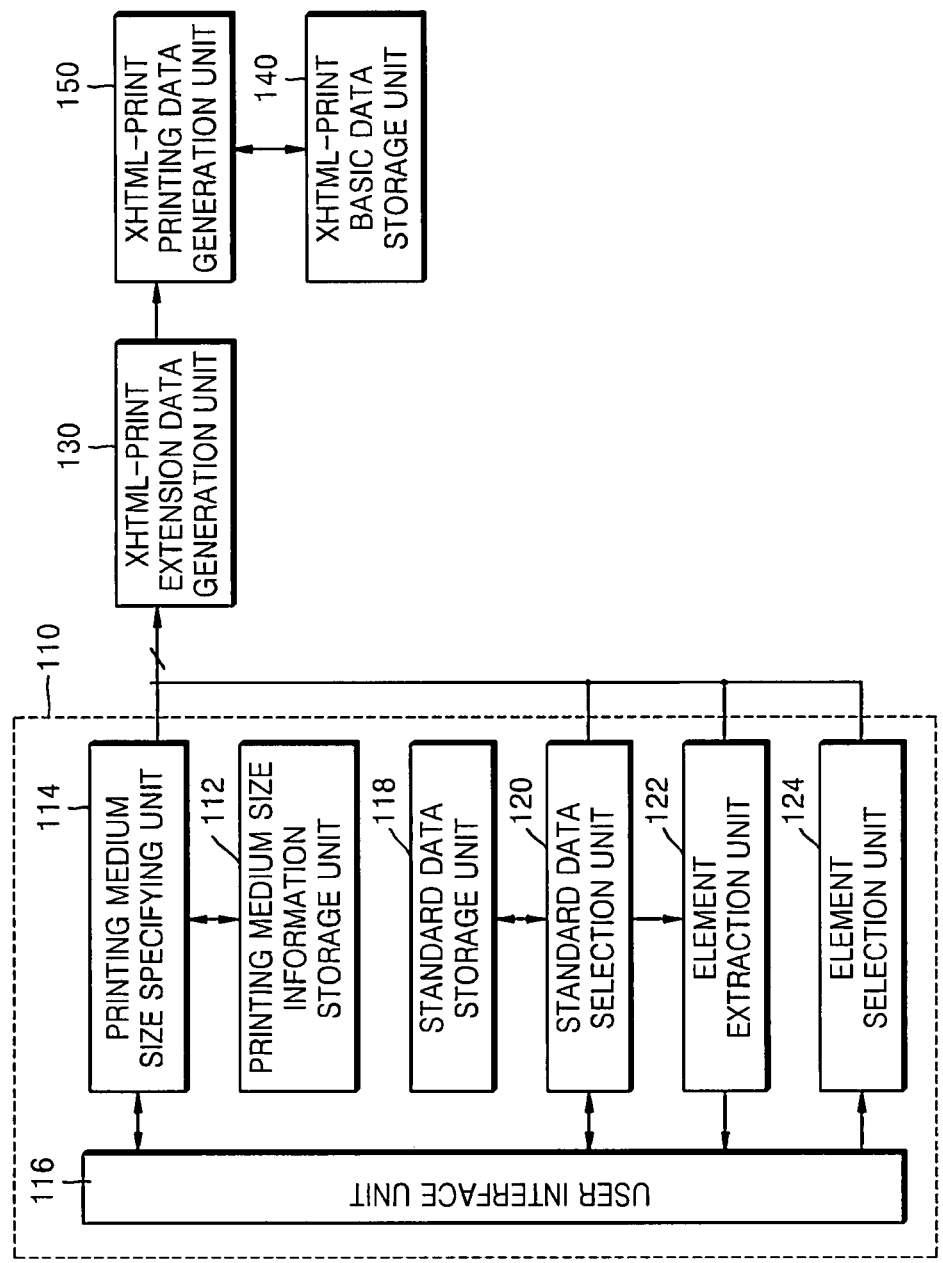
FIG. 1 is a block diagram explaining an apparatus to generate XHTML-Print printing data according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram explaining an apparatus to generate XHTML-Print printing data according to an embodiment of the present invention. The apparatus includes an XHTML-Print printing data setting unit 110, an XHTML-Print extension data generation unit 130, an XHTML-Print basic data storage unit 140, and an XHTML-Print printing data generation unit 150.

In the present embodiments, XHTML-Print basic data, XHTML-Print extension data, and XHTML-Print printing data are all XHTML-Print data. It is understood that data described in a markup language other than the XHTML language can also be applied, instead of the XHTML-Print data, in the embodiments.

The XHTML-Print printing data setting unit 110, the XHTML-Print extension data generation unit 130, the XHTML-Print basic data storage unit 140, and the XHTML-Print printing data generation unit 150 are all included in a terminal, and an image forming apparatus is connected to the terminal by a wired or wireless connection. However, it is understood that, according to other aspects, the terminal may be connected to a data storage apparatus, such as a network sever, and/or may store the XHTML-Print data in a storage unit or a recordable medium, such as a CD, disk, DVD, flash memory, or SD card. The image forming apparatus can print printing data described in an XHTML-Print language, i.e., XHTML-Print printing data (XHTML-Print Contents). Examples of the terminal include a mobile phone, a digital camera, a computer, and a personal digital assistant (PDA). Also, examples of the image forming apparatus include a printer and a multi-function peripheral (MFP) having a printer function.

Data desired to be printed among data stored in the terminal may be data having standardized contents (standard data). The standard data is data whose contents are classified by standardized elements. Accordingly, standard data items of an identical type have common elements. That is, a standard data item, such as a specific text message, has the same elements as a same-type standard data item, such as another test message. Short message service (SMS) data, multimedia messaging service (MMS) data, and e-mail data are examples of the standard data types. For example, in the case of SMS data, standard data elements can include data corresponding to a caller (From), data corresponding to a callee (To), data corresponding to message contents (Message), data corresponding to a received time (Time), data corresponding to a degree of importance (Priority Level), data corresponding to a security requirement degree (Privacy Level), and/or data corresponding to accumulated response times (Number of Replies). According to an aspect of the present invention, From, To, Message, Time, Priority Level, Privacy Level, and Number of Replies are standardized elements of the SMS data.

The XHTML-Print printing data setting unit 110 sets printing-related options to determine contents to be printed from among contents of one or more standard data items desired to be printed. Examples of the printing-related options may be a size of a print medium the XHTML-Print printing data will be printed on, which standard data items will be printed, and data items of which element will be printed from among standard data items desired to be printed.

The XHTML-Print printing data setting unit 110 includes a print medium size information storage unit 112, a print medium size specifying unit 114, a user interface unit 116, a standard data storage unit 118, a standard data selection unit 120, an element extraction unit 122, and/or an element selection unit 124. However, it is understood that according to other aspects, the XHTML-Print printing data setting unit may include other units to store and/or select other types of printing-related options.

The print medium size information storage unit 112 stores print medium size information. Here, the paper size information is information about available sizes of print media on which XHTML-Print printing data is to be printed. The print media may be paper, or any type of tangible medium on which content may be printed, such as a transparency.

The print medium size specifying unit 114 commands the user interface unit 116 to display the print medium size information stored in the print medium size information storage unit 112. In this case, the user interface unit 116 displays the stored print medium size information. By doing so, the user can recognize what sizes of print media on which XHTML-Print printing data may be printed are available.

Then, the user may specify a desired size through the user interface unit 116 or by manipulating keys disposed on the terminal. According to other aspects, the user may specify a desired size through other methods and/or devices, such as a touch screen and/or a scroll wheel. By doing so, the paper size specifying unit 114 specifies the size selected by the user from among the stored paper sizes. Also, the print medium size specifying unit 114 reads information on the specified size from the stored print medium size information, and outputs the read information on the specified size to the XHTML-Print extension data generation unit 130.

The standard data storage unit 118 stores one or more standard data items. The user interface unit 116 displays the stored standard data according to an instruction from the standard data selection unit 120. By doing so, the user can recognize which standard data items are stored in the terminal. Then, the user can select one or more standard data items desired to be printed through the user interface unit 116 or by manipulating keys disposed on the terminal, and/or by other methods, such as a touch screen and/or a scroll wheel. By doing so, the standard data selection unit 120 can select one or more standard data items desired to be printed from among the stored standard data items. Meanwhile, the standard data selection unit 120 outputs the selected standard data to the XHTML-Print extension data generation unit 130.

The element extraction unit 122 analyzes elements of each of the selected standard data items. By doing so, the element extraction unit 122 extracts one or more elements appearing in the selected standard data, and commands the user interface 116 to display the extracted elements. The user interface unit 116 then displays the extracted elements. Also, the element extraction unit 122 classifies the selected standard data items in relation to extracted elements, and matches the classified data items with the extracted elements.

The element selection unit 124 selects one or more elements desired to be printed by the user from among the displayed elements. For this, the element selection unit 124 displays, for example, a window to request selection of elements desired to be printed through the user interface unit 116. Then, the user may select elements desired to be printed through the user interface 116 or by manipulating keys, and/or other methods, such as a touch screen and/or a scroll wheel, disposed on the terminal. By doing so, the element selection unit 124 selects elements desired to be printed.

If elements are thus selected, the element selection unit 124 provides information on the classified data matched with the selected elements and the selected elements to the XHTML-Print extension data generation unit 130.

The XHTML-Print extension data generation unit 130 generates XHTML-Print extension data, by using the print medium size specified by the print medium size specifying unit 114, the one or more standard data items selected by the standard data selection unit 120, the one or more elements extracted by the element extraction unit 122 and the classified data items corresponding to the elements, and the one or more elements selected by the element selection unit 124.

The XHTML-Print basic data storage unit 140 stores essential XHTML-Print basic data that is included in XHTML-Print printing data. The XHTML-Print extension data generated in the XHTML-Print extension data generation unit 130 can be inserted into XHTML-Print basic data.

The XHTML-Print printing data generation unit 150 reads the XHTML-Print basic data stored in the XHTML-Print basic data storage unit 140, and generates XHTML-Print printing data by inserting the generated XHTML-Print extension data into the read XHTML-Print basic data.

FIGS. 2A through 2I are reference diagrams explaining a principle of generating XHTML-Print printing data when standard data is SMS data, according to an embodiment of the present invention.

The user interface unit 116 displays a window as illustrated in FIG. 2A according to an instruction of the print medium size specifying unit 114. Referring to FIG. 2A, the XHTML-Print printing data may be printed on a print medium with a size of 4×6 inch (portrait), 6×4 inch (landscape), A4 portrait, A4 landscape, letter portrait, or letter landscape. It is understood that other print media sizes, such as legal portrait and/or legal landscape, may be provided.

If the print medium size specifying unit 114 specifies printing of XHTML-Print printing data on a print medium with a size of 6×4 (landscape) without a margin, the XHTML-Print extension data generation unit 130 generates XHTML-Print extension data as @page {size: 6in 4in; margin: 0 in;}.

Likewise, if the print medium size specifying unit 114 specifies printing of XHTML-Print printing data on a print medium with a size of A4 portrait without a margin, the XHTML-Print extension data generation unit 130 generates XHTML-Print extension data as @page {size: A4 portrait; margin: 0 in;}.

Similarly, if the print medium size specifying unit 114 specifies printing of XHTML-Print printing data on a print medium with a size of A4 landscape without a margin, the XHTML-Print extension data generation unit 130 generates XHTML-Print extension data as @page {size: A4 landscape; margin: 0 in;}.

Also, if the print medium size specifying unit 114 specifies printing of XHTML-Print printing data on a print medium with a size of letter portrait without a margin, the XHTML-Print extension data generation unit 130 generates XHTML-Print extension data as @page {size: letter portrait; margin: 0 in;}.

Similarly, if the print medium size specifying unit 114 specifies printing of XHTML-Print printing data on a print medium with a size of letter landscape without a margin, the XHTML-Print extension data generation unit 130 generates XHTML-Print extension data as @page {size: letter landscape; margin: 0 in;}.

However, as illustrated in FIG. 2A, since the print medium size specifying unit 114 specifies printing of XHTML-Print printing data on a print medium with a size of 4×6 inch (portrait), the XHTML-Print extension data generation unit 130 generates XHTML-Print extension data as @page {size: 4 in 6 in; margin: 0 in.}.

The user interface unit 116 can display all SMS data stored in the standard data storage unit 118 according to an instruction from the standard data selection unit 120. Referring to FIG. 2B, the user interface unit 116 displays a total of 6 SMS data items.

The standard data selection unit 118 can select one or more SMS data items desired to be printed from among the displayed SMS data items. Referring to FIG. 2B, the standard data selection unit 118 selects two SMS data items (a first SMS data item and a third SMS data item) from among the displayed SMS data items.

The element extraction unit 122 analyzes each of the selected SMS data items, and extracts one or more elements appearing in the selected SMS data items. In this case, the user interface unit 116 displays the extracted elements. Referring to FIG. 2C, the elements appearing in the first SMS data item are a caller (From), a callee (To), message contents (Message), a received time (Time), a degree of importance (Priority Level), a security requirement degree (Privacy Level), and accumulated response times (Number of Replies). Also, the elements appearing in the third SMS data item are caller (From), a callee (To), message contents (Message), and accumulated response times (Number of Replies).

Meanwhile, it may be impossible to select elements that cannot be generated as. XHTML-Print printing data by the terminal from among the extracted elements. Also, the elements that cannot be selected may be distinguished from the other elements, as in FIG. 2C where the elements that cannot be selected are shaded. For example, if a number for replies (Number for reply) is an element that cannot be generated as XHTML-Print printing data by the terminal, it may be distinguished from other elements. According to other aspects, the elements that cannot be generated as XHTML-Print printing data may be distinguished by other methods, such as a different font, color, or style, or may not be displayed at all.

The element selection unit 124 selects one or more elements desired to be printed by the user from among the displayed elements. Referring to FIG. 2D, the one or more elements desired to be printed by the user are a caller, a callee, message contents and a received time.

Meanwhile, the extracted elements may be divided into header elements and message elements. Here, the message elements are elements indicating the contents of a message and the header elements are elements excluding the message elements. That is, a caller, a callee, and a received time are examples of header elements and message contents is a message element. In the following examples, the style that each of these elements is displayed is set as a default. However, the user may set the style for each element as desired by the user. To do this, in the XHTML-Print printing data setting unit 110 according to the present embodiment, a style database (not shown), a style reading unit (not shown) and a style setting unit (not shown) may be provided. In this case, the style reading unit (not shown) receives an input about a style desired by the user, reads a style corresponding to the input from the style database (not shown), and provides the style to the style setting unit (not shown). Then the style setting unit (not shown) sets the style of the elements according to the received style.

FIG. 2E illustrates XHTML-Print basic data stored in the XHTML-Print basic data storage unit 140, and FIG. 2F illustrates XHTML-Print printing data that is XHTML-Print basic data into which XHTML-Print extension data is inserted. XHTML-Print extension data generated by using the contents specified in the print medium size specifying unit 114, for example, @page {size: 4 in 6 in; margin: 0 in;}, is inserted into the XHTML-Print basic data as indicated by subscript 1 shown in FIG. 2F.

The XHTML-Print extension data generation unit 130 generates XHTML-Print extension data by using the elements selected by, for example, the element selection unit 124 and the classified data items corresponding to the elements. For this, the XHTML-Print extension data generation unit 130 generates XHTML-Print extension data for each of the elements selected by the element selection unit 124, excluding message contents, as follows:

```
<tr>
<td class= "td1">
   selected elements
</td>
<td class= "td2">
   .
   .
</td>
<td>
```

```
          data corresponding to the selected elements
            </td>
          </tr>
```

This generated XHTML-Print extension data is inserted into the XHTML-Print basic data, as indicated by subscripts 2, 3, and 4 shown in FIG. 2F.

Also, in the case of the message contents among the elements selected by the element selection unit 124, the XHTML-Print extension data generation unit 130 generates XHTML-Print extension data by using </br> indicating the end of a row for each row of the message. This generated XHTML-Print extension data is inserted between <div class="BodyBox"> and </div> of the XHTML-Print basic data, as indicated by subscript 5 shown in FIG. 2F.

FIG. 2G illustrates an example of a printed result on which XHTML-Print printing data generated by the XHTML-Print printing data generation unit 150 is printed. As illustrated in FIG. 2G, the size of SMS data can be variably determined with respect to the quantity of the SMS data. That is, FIG. 2F illustrates XHTML-Print data in which a size for printing SMS data is determined with respect to the quantity of the SMS data.

FIG. 2H illustrates another example of a printed result on which XHTML-Print printing data generated by the XHTML-Print printing data generation unit 150 is printed. As illustrated in FIG. 2H, the size for printing the SMS data may also be determined irrespective of the quantity of the SMS data. Thus, in order to determine the size for printing the SMS data irrespective of the quantity of the SMS data, the XHTML-Print printing data may be described as illustrated in FIG. 2I.

Figure 3A:
Figure 3C:

FIGS. 3A through 3D are reference diagrams explaining a principle of generating XHTML-Print printing data when standard data is MMS data, according to an embodiment of the present invention. More specifically, FIGS. 3A and 3C illustrate printed results desired by the user. FIG. 3B illustrates XHTML-Print data in which the size for printing MMS data is determined depending on the quantity of the MMS data as illustrated in FIG. 3A. Meanwhile, FIG. 3D illustrates XHTML-Print data in which the print medium size for printing MMS data is determined irrespective of the quantity of the MMS data, as illustrated in FIG. 3C.

A principle of generating XHTML-Print printing data according to an aspect of the present invention, when the standard data is MMS data, is the same as the principle of generating XHTML-Print printing data according to an aspect of the present invention when the standard data is SMS data. Accordingly, an explanation of the principle of generating XHTML-Print printing data according to an aspect of the present invention when the standard data is SMS data with reference to FIGS. 2A through 2I can also be applied to the principle of generating XHTML-Print printing data according to an aspect of the present invention when the standard data is MMS data.

Figure 4:
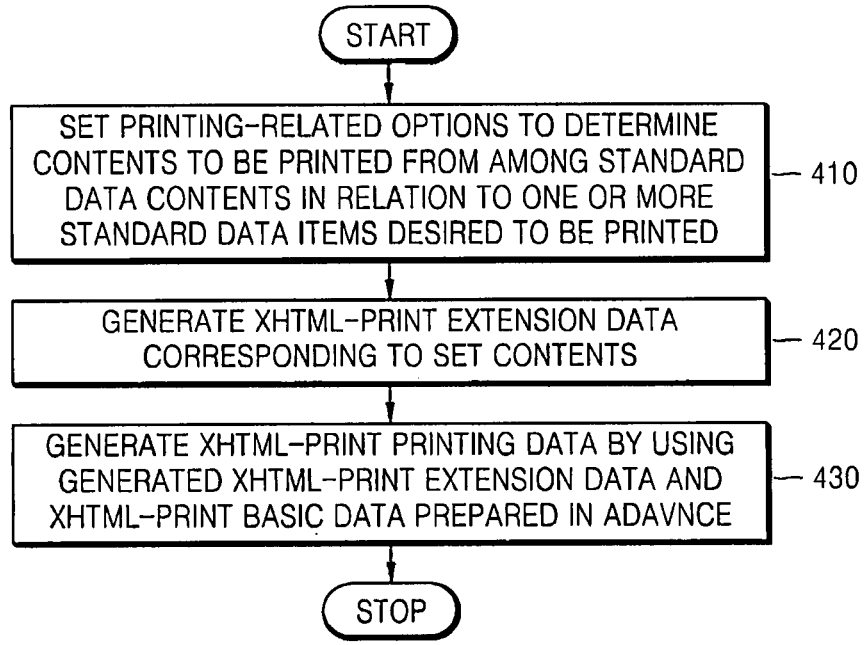
FIG. 4 is a flowchart illustrating a method of generating XHTML-Print printing data according to an embodiment of the present invention.

FIG. 4 is a flowchart illustrating a method of generating XHTML-Print printing data according to an embodiment of the present invention. The method is composed of operations 410 through 430 to generate XHTML-Print extension data corresponding to the contents of standard data desired to be printed, and to generate XHTML-Print printing data by inserting the generated XHTML-Print extension data into XHTML-Print basic data prepared in advance.

The XHTML-Print printing data setting unit 110 sets printing-related options to determine the contents to be printed from among the contents of each of standard data items desired to be printed in operation 410.

In operation 420, the XHTML-Print extension data generation unit 130 generates XHTML-Print extension data corresponding to the contents set in operation 410.

The XHTML-Print printing data generation unit 150 inserts the XHTML-Print extension data generated in operation 420 into XHTML-Print basic data prepared in advance and generates XHTML-Print printing data in operation 430.

Figure 5:
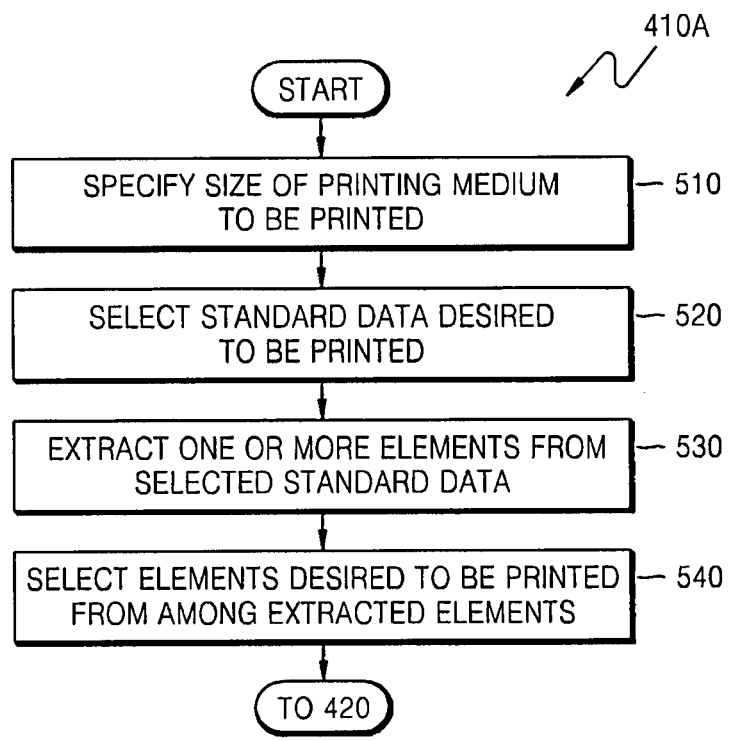
FIG. 5 is a detailed flowchart of an operation of FIG. 4, where print related options are set according to an embodiment of the present invention.

FIG. 5 is a detailed flowchart of an embodiment 410A of operation 410 of FIG. 4 according to an embodiment of the present invention, and shows operations 510 through 540 to set printing-related options.

In operation 510, the size of a print medium on which standard data desired to be printed is set, and in operation 520, one or more standard data items are selected from among one or more standard data items prepared in advance.

In operation 530, one or more elements are extracted from the standard data items selected in operation 520, and in operation 540, one or more elements desired to be printed are selected from among the elements extracted in operation 530.

The present invention can also be embodied as computer-readable codes on a computer-readable recording medium. The computer-readable recording medium is any data storage device that can store data which can be thereafter read by a computer system or a system that can process computer codes, or segments thereof. Examples of the computer-readable recording medium include read-only memory (ROM), random-access memory (RAM), CD-ROMs, magnetic tapes, floppy disks, optical data storage devices, and etc. The computer-readable recording medium can also be distributed over network coupled computer systems so that the computer-readable code is stored and executed in a distributed fashion.

According to a method and an apparatus to generate XHTML-Print printing data, XHTML-Print extension data corresponding to the contents of standard data desired to be printed is generated, and inserted into XHTML-Print basic data prepared in advance so that XHTML-Print printing data is generated. Accordingly, even when data desired to be printed and stored in a terminal has text, XHTML-Print printing data can be generated. Therefore, the terminal in which the XHTML-Print printing data generation method is performed can generate XHTML-Print printing data in order to print SMS data, MMS data, and email data stored in the terminal, even though the terminal does not have many resources compared to a personal computer.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of generating extensible hypertext markup language (XHTML) data from predetermined content selected and set with printing options by a user, said method comprising:

by a terminal which is distinct from an image forming apparatus, setting printing-related options to determine contents to be printed from among one or more predetermined contents of each of one or more standard data items;

by the terminal, generating XHTML extension data corresponding to the set printing- related options; and by the terminal, generating XHTML printing data by adding the generated XHTML extension data to XHTML basic data prepared in advance, wherein the setting of the printing-related options comprises:

selecting the one or more standard data items from among one or more predetermined standard data items, classifying the one or more predetermined contents of the selected one or more standard data items according to a content type and selecting the contents to be printed from among the classified one or more predetermined contents, wherein contents, from among the classified one or more predetermined contents, corresponding to a content type that cannot be generated as XHTML printing data cannot be selected, extracting the one or more predetermined contents of each of the selected one or more standard data items;

selecting the contents to be printed from among the extracted one or more predetermined contents, and classifying the extracted one or more predetermined contents into a header contents, which are contents that are not of a message, and a message contents, which are contents of the message.

2. The method as claimed in claim 1, wherein the setting of the printing-related options comprises:

selecting the contents to be printed from among the one or more predetermined contents.

3. The method as claimed in claim 1, wherein the setting of the printing-related options comprises configuring printing settings.

4. The method as claimed in claim 3, wherein the configuring of printing settings comprises specifying a size of a print medium on which the contents to be printed are to be printed.

5. The method as claimed in claim 1, wherein the setting of the printing-related options comprises:

classifying the one or more predetermined contents of the one or more standard data items according to a content type and selecting the contents to be printed from among the classified one or more predetermined contents.

6. The method as claimed in claim 5, wherein the content type is a caller, a callee, message contents, a received time, a degree of importance, a security requirement degree, and/or accumulated response times.

7. The method as claimed in claim 5, wherein contents, from among the classified one or more predetermined contents, corresponding to a content type that cannot be generated as XHTML printing data cannot be selected.

8. The method as claimed in claim 1, further comprising:

by the terminal, outputting the generated XHTML printing data to the image forming apparatus.

9. The method as claimed in claim 1, wherein the one or more standard data items are short message service (SMS) data, multimedia messaging service (MMS) data, and/or e-mail data.

10. A non-transitory computer readable recording medium encoded with the method of claim 1 implemented by a computer.

11. The method as claimed in claim 1, wherein the standard data items are classified by a type, and wherein the standard data items contain elements, and wherein standard data items that are the same type have common elements.

12. An apparatus to generate extensible hypertext markup language (XHTML) data from predetermined content selected and set with printing options by a user, said apparatus comprising:

an XHTML data setting unit to set printing-related options to determine contents to be printed from among one or more predetermined contents of each of one or more standard data items;

an XHTML basic data storage unit to store XHTML basic data;

an XHTML extension data generation unit to generate XHTML extension data according to the set printing-related options; and an XHTML data generation unit to read the stored XHTML basic data, and to generate XHTML printing data by adding the generated XHTML extension data to the read XHTML basic data, wherein the apparatus is included in a terminal which is distinct from an image forming apparatus, wherein the XHTML data setting unit comprises:

a standard data selection unit to select the one or more standard data items from among one or more predetermined standard data items, an element selection unit to classify the one or more predetermined contents of the selected one or more standard data items according to a content type and to select the contents to be printed from among the classified one or more predetermined contents, wherein contents, from among the classified one or more predetermined contents, corresponding to a content type that cannot be generated as XHTML printing data cannot be selected, an element extraction unit to extract the one or more predetermined contents of each of the selected one or more standard data items, an element selection unit to select the contents to be printed from among the extracted one or more predetermined contents, and wherein the element selection unit classifies the one or more predetermined contents into a header contents, which are contents that are not of a message, and message contents, which are contents of the message.

13. The apparatus as claimed in claim 12, wherein the XHTML data setting unit comprises:

an element selection unit to select the contents to be printed from among the one or more predetermined contents.

14. The apparatus as claimed in claim 12, wherein the XHTML data setting unit configures printing settings.

15. The apparatus as claimed in claim 14, wherein the XHTML data setting unit further comprises a print medium size specifying unit to specify a size of a print medium on which the contents to be printed are to be printed.

16. The apparatus as claimed in claim 12, wherein the XHTML data setting unit comprises:

an element selection unit to classify the one or more predetermined contents of the one or more standard data items according to a content type and to select the contents to be printed from among the classified one or more predetermined contents.

17. The apparatus as claimed in claim 16, wherein the content type is a caller, a callee, message contents, a received time, a degree of importance, a security requirement degree, and/or accumulated response times.

18. The apparatus as claimed in claim 16, wherein contents, from among the classified one or more predetermined contents, corresponding to a content type that cannot be generated as XHTML printing data cannot be selected.

19. The apparatus as claimed in claim 12, wherein the one or more standard data items are SMS data, MMS data, and/or e-mail data.

20. The apparatus as claimed in claim 12, wherein the apparatus is a mobile phone, a digital camera, or a personal digital assistant.

21. A method of generating extensible hypertext markup language (XHTML) data from predetermined content selected and set with printing options by a user, said method comprising:
by a terminal which is distinct from an image forming apparatus, setting printing-related options to determine contents to be printed from among one or more predetermined contents of each of one or more standard data items; and
by the terminal, generating XHTML printing data corresponding to the set printing-related options,
wherein the generating of the XHTML printing data comprises:
generating XHTML extension data corresponding to the set printing-related options; and
generating the XHTML printing data by adding the generated XHTML extension data to XHTML basic data, and
wherein the setting of the printing-related options comprises:
selecting the one or more standard data items from among one or more predetermined standard data items,
extracting the one or more predetermined contents of each of the selected one or more standard data items; and
selecting the contents to be printed from among the extracted one or more predetermined contents.

22. The method as claimed in claim 21, wherein the setting of the printing-related options comprises:
selecting the contents to be printed from among the one or more predetermined contents.

23. The method as claimed in claim 21, wherein the setting of the printing-related options comprises configuring printing settings.

24. The method as claimed in claim 23, wherein the configuring of printing settings comprises specifying a size of a print medium on which the contents to be printed are to be printed.

25. The method as claimed in claim 21, wherein the setting of the printing-related options comprises:
classifying the one or more predetermined contents of the one or more standard data items according to a content type and selecting the contents to be printed from among the classified one or more predetermined contents.

26. The method as claimed in claim 25, wherein contents, from among the classified one or more predetermined contents, corresponding to a content type that cannot be generated as XHTML printing data cannot be selected.

27. A non-transitory computer readable recording medium encoded with the method of claim 21 implemented by a computer.

28. An apparatus to generate extensible hypertext markup language (XHTML) data from predetermined content selected and set with printing options by a user, said apparatus comprising:
an XHTML data setting unit to set printing-related options to determine contents to be printed from among one or more predetermined contents of each of one or more standard data items; and
an XHTML extension data generation unit to generate XHTML extension data according to the set printing-related options,
an XHTML basic data storage unit to store XHTML basic data;
an XHTML data generation unit to read the stored XHTML basic data, and to generate XHTML printing data by adding the generated XHTML extension data to the read XHTML basic data,
wherein the apparatus is included in a terminal which is distinct from an image forming apparatus, and
wherein the XHTML data setting unit comprises:
a standard data selection unit to select the one or more standard data items from among one or more predetermined standard data items,
an element extraction unit to extract the one or more predetermined contents of each of the selected one or more standard data items; and
an element selection unit to select the contents to be printed from among the extracted one or more predetermined contents.

29. The apparatus as claimed in claim 28, wherein the XHTML data setting unit comprises:
an element selection unit to select the contents to be printed from among the one or more predetermined contents.

30. The apparatus as claimed in claim 28, wherein the XHTML data setting unit configures printing settings.

31. The apparatus as claimed in claim 30, wherein the XHTML data setting unit further comprises a print medium size specifying unit to specify a size of a print medium on which the contents to be printed are to be printed.

32. The apparatus as claimed in claim 28, wherein the XHTML data setting unit comprises:
an element selection unit to classify the one or more predetermined contents of the one or more standard data items according to a content type and to select the contents to be printed from among the classified one or more predetermined contents.

33. The apparatus as claimed in claim 32, wherein contents, from among the classified one or more predetermined contents, corresponding to a content type that cannot be generated as XHTML printing data cannot be selected.

* * * * *

UNITED STATES PATENT AND TRADEMARK OFFICE
CERTIFICATE OF CORRECTION

| | |
|---|---|
| PATENT NO. | : 8,587,800 B2 |
| APPLICATION NO. | : 11/715841 |
| DATED | : November 19, 2013 |
| INVENTOR(S) | : Sung-won Chae |

It is certified that error appears in the above-identified patent and that said Letters Patent is hereby corrected as shown below:

In the Claims

In Column 8, Line 64, In Claim 1, delete "printing- related" and insert -- printing-related --, therefor.

Signed and Sealed this
Twenty-fifth Day of March, 2014

Michelle K. Lee
*Deputy Director of the United States Patent and Trademark Office*